United States Patent [19]
Hoffmeyer

[11] 3,754,385
[45] Aug. 28, 1973

[54] LAWN MOWER ROLLER SUPPORT
[75] Inventor: Knud H. Hoffmeyer, Racine, Wis.
[73] Assignee: Jacobsen Manufacturing Company, Racine, Wis.
[22] Filed: July 3, 1972
[21] Appl. No.: 268,544

[52] U.S. Cl. .................................. 56/17.2, 280/43
[51] Int. Cl. ............................................ A01d 35/26
[58] Field of Search ........................... 56/17.2, 255; 280/43

[56] References Cited
UNITED STATES PATENTS
2,867,960   1/1959   Stiles et al. ...................... 280/43 X
2,879,074   3/1959   Roberton et al. .................... 280/43
3,043,604   7/1962   Rehnberg et al. ................... 280/43
3,334,911   8/1967   Enters ............................. 280/43

Primary Examiner—Louis G. Mancene
Assistant Examiner—J. A. Oliff
Attorney—Arthur J. Hansmann

[57] ABSTRACT

A lawn mower roller support with a support member affixed to a mower for supporting a roller which is on an adjustable piece. The support member and the adjustable piece have a rod extending therethrough in aligned openings in the support member and the adjustable piece, for altering the elevation of the roller. The rod has a head which includes a portion projectable into the support member for retaining the adjustable piece relative to the support member. A spring is on the rod and yieldingly urges the rod into the openings in the support member and the adjustable piece.

7 Claims, 3 Drawing Figures

Patented Aug. 28, 1973
3,754,385
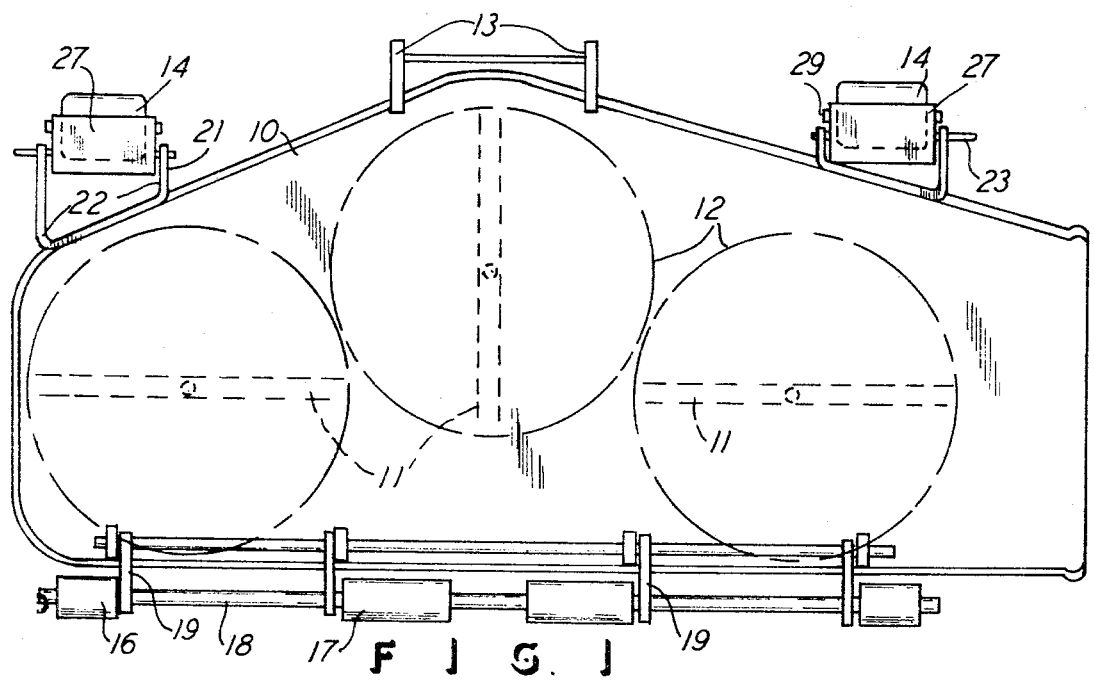
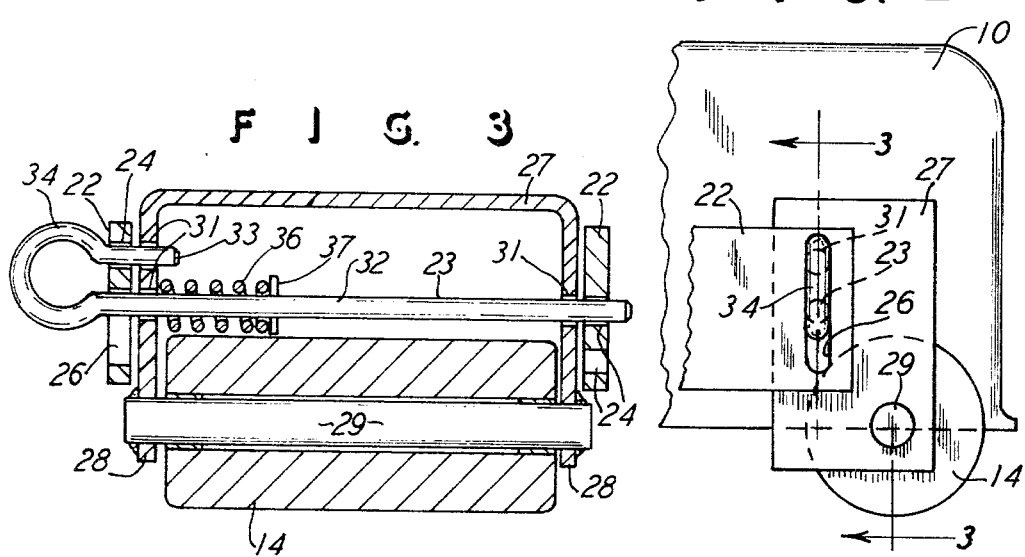

LAWN MOWER ROLLER SUPPORT

This invention relates to a lawn mower roller support and, more particularly, it relates to a lower support which can be adjusted in its position of elevation.

BACKGROUND OF THE INVENTION

Roller supports which can be varied or adjusted in their elevation are commonly known in the art. These supports are commonly mounted on shafts which are supported by brackets, links, or the like which are vertically movable for adjusting the elevation of the roller. However, the prior art adjustable rollers usually require links or other members which extend a distance from the roller itself and which are expensive and bulky and which must be sturdy and pinned or otherwise affixed between the mower and the roller itself.

In the present invention, the roller is vertically adjustable and this adjustment is accomplished through means which are relatively inexpensive, which are compact in that they are located immediately adjacent the roller itself, and the means are arranged so that the adjustment can be readily and easily accomplished. In accomplishing these objectives, the means of this invention are inexpensive but yet are sturdy, and they are easily manufactured and maintained.

Still further, the roller support of this invention is relatively short in the axial direction of the roller, and the support is therefore arranged so that it is stable in the end-to-end relationship of the roller, and no long shaft and mounting at each end of a shaft are required for stability of this relatively short roller. Further, this type of roller is useful in providing an anti-scalping means for the front end of a rotary type of lawn mower, and the roller can be readily set in a position for lowering the mower housing when the housing is to be attached to a tractor through a hitch connection. Subsequently, the roller can be set for elevating the mower housing when the tractor-conveyed mower is being used in its mowing function.

In these instances of adjustment or re-setting, the roller is positioned between two specific positions of elevation, so the mower housing is likewise definitely positioned for the purpose of hitch attachment and the purpose of anti-scalping function during the mowing process or for supporting the mower during mowing.

Other objects and advantages will become apparent upon reading the following disclosure.

BRIEF DESCRIPTION OF THE DRAWINGS

FIG. 1 is a top plan view of a mower having a roller support of this invention.

FIG. 2 is an enlarged side-elevational view of the roller support shown in FIG. 1.

FIG. 3 is a sectional view taken along the line 3—3 of FIG. 2.

DETAILED DESCRIPTION OF THE PREFERRED EMBODIMENT

A large lawn mower is shown to include a housing 10 and three rotary cutters 11 which are shown in dotted lines and which describe the circles 12 indicated by dot-dash lines. The mower 10 has hitch plates 13 at the front end thereof, and the plates 13 are available for attaching to a tractor which is not shown but the attachment would be in a conventional manner. Front rollers 14 and rear rollers 16 and 17 are shown mounted on the mower 10 to support the mower on the ground. The rear rollers 16 and 17 are shown on a shaft 18 supported on the mower 10 through brackets 19, and these rollers 16 and 17 can be adjustably mounted on the mower 10 for altering the elevation of the mower and thus the cutting height of the cutters 11.

The forwardly located rollers 14 are secured by roller supports of this invention, and that includes the U-shaped support member 21 having the two spaced-apart supports 22 which are the legs of the members 21. The member 21 is suitably secured to the mower 10 to project forwardly thereof and to carry a rod 23 which extends through openings in the supports 22. These openings are circular openings 24 and a slot 26 which is vertically disposed.

A U-shaped piece 27 is disposed between the supports 22 and has its spaced-apart legs 28 extending downwardly to support a roller shaft 29 which in turn rotatably supports the roller 14. The spaced-apart pieces or legs 28 have openings 31, and these openings receive the body portion 32 of the rod 23, and the upper opening 31 receives the end or projection portion 33 of the rod 23. That is, the rod 23 includes the body portion 32 and the looped head portion 34 which terminates in the end 33.

With the rod 23 extending through the slot 26 and the two lower holes 31 in the piece 27 and through the upper hole 24 in the one support member 22; as shown in FIG. 3, the roller 14 is in its upward position relative to the support 21, and therefore the mower would be supported in its lower position.

When it is desired to elevate the mower, the rod 23 can be withdrawn from the support hole 24 and from the upper hole 31, and the rod can be slid downwardly in the slot 26 and then again inserted into the holes by moving the rod end 33 into the lower hole 31, and the other end of the rod could be inserted into the support lower hole 24. This lowering of the rod 23 on the support 21 will of course lower the roller and thus raise the mower housing. The spacing of the rod end 33 from the rod body 32 is only slightly less than the height of the slot 26, so the rod ends will fit simultaneously in the slot 26 when the rod is repositioned as just described. In both positions of the rod, the rod acts as a shear member and maintains the two U-shaped members in their relative elevations depending upon rod positioning as described. That is, the rod end 33 in the slot 26 will also have the end 33 extending through the lower hole 31 and thus that rod end 33 serves as a shear pin to maintain the two U-shaped members 21 and 27 in their relative elevated positions.

A compression spring 36 extends between a fixed pin 37 on the rod 23 and the piece 28 to yieldingly urge the rod 23 to the right, as viewed in FIG. 3, but the spring 36 permits withdrawal of the rod to an amount sufficient to have the rod end 33 withdrawn from the upper hole 31 and also have the other end of the rod withdrawn from the upper hole 24, when the repositioning as described is being affected.

In the arrangement described, the slot 26 permits the adjustment without requiring full withdrawal of the rod 23. Further, the upper opening 31, and the opening 24 which is axially aligned therewith, are both offset from the other openings and are therefore available for receiving the rod end 33 in a latched or secured position. Still further, the head portion 34 will of course abut the adjacent support member 22 and thus limit the movement of the rod 23 into the openings described. Thus there is provided a vertically adjustable roller which serves for positioning the lawn mower when the lawn mower is being hitch-connected to a tractor, and it serves to elevate the mower relative to the ground, such as the function of serving as an anti-scalping roller at the forward end of a mower.

What is claimed is:

1. A lawn mower roller support for a mobile type of lawn mower including a lawn cutter, two spaced-apart supports on said lawn mower and each having two openings therein vertically spaced from each other, a rod extending through a first one of said openings on each of said supports, a releasable member on said rod for releasably retaining said rod in said openings, a portion off one end of said rod insertable into one of said openings other than said first openings for retaining said rod on said supports, the second one of said openings adjacent said rod portion being a vertically disposed slot for vertical movement of said rod when the end of said rod opposite said one end and said rod portion are retracted from their respective said openings, said portion being insertable into said slot for vertically retaining said rod in said slot when said end of said rod is in its second one of said openings, a roller, and two spaced-apart pieces respectively adjacent said supports and having openings axially aligned with said openings on said supports for receiving said rod and for rotatably supporting said roller for vertical adjustment along with the adjustable positioning of said rod in said support openings.

2. The lawn mower roller support as claimed in claim 1, including a head on said rod and forming said rod portion for limiting movement of said rod into said openings and for retracting said rod from said openings.

3. The lawn mower roller support as claimed in claim 2, wherein said rod is one continuous rod piece including said head which is a loop terminating in a free end insertable into said openings.

4. The lawn mower roller support as claimed in claim 1, including a U-shaped member affixed to said lawn mower and with the legs of said U-shaped member being said spaced-apart supports.

5. The lawn mower roller support as claimed in claim 1, wherein said releasable member is a spring yieldingly urging said rod into a seated position in said openings.

6. The lawn mower roller support as claimed in claim 1, wherein said slot is on one of said supports and is axially aligned with two of said openings on the other one of said supports, and with said one of said supports having one of said openings adjacent said slot and being axially offset from said two openings for receiving said rod portion.

7. The lawn mower roller support as claimed in claim 1, wherein said portion is disposed from the remainder of said rod a distance equal to the length of said slot to be positioned within said slot along with the remainder of said rod extending through said slot.

* * * * *

UNITED STATES PATENT OFFICE
CERTIFICATE OF CORRECTION

Patent No. 3,754,385    Dated August 28, 1973

Inventor(x)  Knud H. Hoffmeyer

It is certified that error appears in the above-identified patent and that said Letters Patent are hereby corrected as shown below:

In Claim 1, at Column 3 on line 15, change "off" to --of--

Signed and sealed this 27th day of November 1973.

(SEAL)
Attest:

EDWARD M. FLETCHER, JR.          RENE D. TEGTMEYER
Attesting Officer                Acting Commissioner of Patents